United States Patent Office 3,433,759
Patented Mar. 18, 1969

3,433,759
ROOM TEMPERATURE CURABLE LIQUID
CONJUGATED DIENE COMPOSITIONS
Joseph James Bayerl, Wayne, Hendrik Kamiel de Decker, Montclair, and Ying Kao Lee and David Ivan Sapper, West Caldwell, N.J., assignors to Texas-U.S. Chemical Company, Parsippany, N.J., a corporation of Delaware
No Drawing. Filed July 17, 1964, Ser. No. 383,493
U.S. Cl. 260—33.6         16 Claims
Int. Cl. C07d 11/04; C07c 11/30, 11/04

ABSTRACT OF THE DISCLOSURE

A novel liquid polymer composition which is readily cured to the elastomeric state. The polymeric portion of the liquid composition is at least one homopolymer or copolymer of an emulsion process conjugated diene having from 4 to 8 carbon atoms, e.g., polybutadiene and styrene-butadiene copolymers. The liquid composition contains at least one stabilizer in a maximum specified concentration, and also contains between 3 and 10 parts of a curing agent. The viscosity of the liquid polymer is between 10 and 20,000 poises at 25° C. The invention provides a method for curing novel liquid polymer compositions to an elastomeric state in periods of up to two hours.

---

The present invention is directed to liquid rubber compositions which are readily cured to an elastomeric state.

There has been increasing use of liquid rubber to form solid elastomeric compounds. These liquid rubbers may be compounded with fillers to form putties for sealing joints. They are used to form caulking compounds for automobile windows, waterproofing, etc. They are also used in preparing molded objects, in casting relatively complex shaped articles and in preparing resilient potting material. They are used in preparing adhesives of the type that are designed to harden on standing. They may also be used for forming protective coatings on cardboard, cloth, metal, etc. Liquid polymeric materials for such purposes have in the past been prepared from depolymerized rubber, polysulfide rubber, silicone rubber, polyurethane, and a number of other specialty rubbers. Liquid polymeric compositions which can be readily cured at low temperatures have not been available from synthetic diene rubbers. The criteria for ready curing is the ability to mold or apply the composition in the form of a liquid or putty and have it "cure" in one to two hours to a non-tacky state. The non-tacky state is one in which the polymeric material is capable of retaining its shape, possesses good resilience and stress/strain properties, and does not feel tacky. It does not necessarily mean that the compound has achieved its state of fullest cure.

It is an object of the present invention to provide novel liquid polymeric compositions. It is also an object of this invention to provide novel compositions of oil-extended relatively high molecular weight liquid polymers. Another object of this invention is to provide liquid polymeric compositions based on homopolymers and copolymers of conjugated dienes which are compounded so that they may be readily cured at room temperature. It is a still further object of this invention to provide liquid polymeric compositions based on homopolymers and copolymers of conjugated dienes which are compounded so that they may be readily cured at elevated temperatures. This invention also contemplates providing a process for curing liquid polymeric compositions wherein the polymeric material is a homopolymer or a copolymer of conjugated diene. Other objects and advantages will in part be apparent and will in part appear hereinafter.

The invention contemplates providing readily curable liquid polymeric compositions, based on emulsion process homopolymers or copolymers of conjugated dienes having four to eight carbon atoms.

The liquid polymeric compositions are prepared from emulsion process homopolymers or copolymers of conjugated dienes having four carbon atoms to eight carbon atoms, including butadiene, isoprene, dimethylbutadiene, etc. The copolymers are formed with one or more copolymerizable ethylenically unsaturated monomers including aromatic vinyl compounds, unsaturated ketones, isobutylenes, acrylonitriles, etc. The preferred materials are homopolymers of butadiene and copolymers of butadiene with styrene in amounts up to about 50% styrene.

The liquid polymers used preferably have a viscosity between about 10 and 5,000 poises at 25° C. Liquid polymers having viscosities within the noted ranges are relatively low molecular weight materials. We also use higher molecular weight polymers having initial viscosities between about 100 and 20,000 poises by extending the polymer with an oil to attain a liquid product having a viscosity between about 10 and 5,000 poises. Compositions having a viscosity between 1000 and 2,000 poises provide the most processable and useful product.

The extender oil may be used in amounts up to 100 parts of extender per 100 parts of polymer and preferably between 20 and 50 parts. The extender oil may be paraffinic, naphthenic, aromatic, or asphaltic; and in the case of the asphalt, it may be either solid or liquid.

Liquid polymer compositions prepared from butadiene homopolymers and styrene-butadiene copolymers prepared by the so-called "cold emulsion" processes are preferred. It has been common practice in the industry to incorporate a free-radical type antioxidant (stabilizer) in synthetic polymers and copolymers of butadiene during the last stages of the polymerization procedure. It is essential, for the purposes of this invention that the level of such materials be left below 0.5 part per hundred of liquid polymer in the liquid polymeric composition. These stabilizers include the strong amine and amine derivatives and phenolic type anti-oxidants, such as the styrenated phenols ("Wing-Stay S"); the alkylated phenols, e.g. 2,2'-methylene-bis-(4-methyl-6-tertiary-butyl phenol) ("Antioxidant 2246"), and 2,6 - ditertiarybutyl-4-methylphenol ("Ionol"); polybutylated Bisphenol A ("Agerite Superlight"); phenyl-beta-naphthylamine, and diphenyl-p-phenylene-diamine ("Wing-Stay 100").

The liquid polymeric compositions will usually include a stabilizer, such as the tris phosphite esters, that functions by reacting with peroxides formed during "oxidation" or "ozonization" of the polymer. These include the aliphatic and aromatic phosphites, such as trioctyl phosphite, triphenyl phosphite, tri (p-tertbutylphenyl) phosphite and tris (phenoxyphenyl) phosphite. The triaryl phosphites are generally preferred; the tris (alkyl substituted phenyl) phosphite, and particularly tris (octylphenyl) phosphite and tris (nonylphenyl) phosphite are particularly preferred. (See, for example, Example 8 of U.S. Patent 2,733,226, Hunter, Jan. 31, 1956.) These stabilizers are used in amounts between about 0.5 part and 5 parts (preferably 1 part and 3 parts) per 100 parts of polymer.

Curing of rubber is generally attributed to a cross-linking action which suppresses plastic deformation while the polymer becomes harder, more resilient and far more rigid. This is also often referred to as vulcanization. Curing of rubber which causes bridges between the polymer chains to form, may be accomplished by materials that decompose to free radicals such as benzoyl peroxide, diazoamino benzenes, and dichloroazodicarbonamidines; by materials that yield free radicals on oxidation such as, mercaptans, phenols, etc.; and by oxidants having the appropriate resonant structure such as quinone oximes and imines. They may also be cross-linked by such traditional vulcanizing agents as sulfur which act to form a sulfur bridge between the different polymer chains. The liquid compositions defined herein may be compounded with known curing agents to obtain the cured solid elastomer.

The preferred low temperature (generally room temperature) vulcanizing (curing) system provides for the incorporation of p-quinone dioxime in the liquid polymeric composition. The composition is "cured" by admixing lead dioxide (or an equivalent oxidant). The polymeric composition contains between about 3 parts and 10 parts and preferably about 5 parts of the p-quinone dioxime. Triethanolamine is usually used in amounts between 1 and 3 parts, and preferably 2 parts, together with the dioxime to speed up the curing action. The addition of an oxidant, such as lead oxide ($PbO_2$) to this compounded liquid polymeric composition causes the composition to cure or "set" in from about 10 to 60 minutes. The lead dioxide is added in the form of a paste, usually compounded with a compatible wetting agent, which is preferably a plasticizer such as dibutylphthalate in amounts of about 1 part of plasticizer to 2 or 3 parts of lead oxide, to facilitate dispersion of lead oxide in the polymeric composition.

Preferred high temperature curing systems are those in which sulfur, usually between about 2 parts and 10 parts, and preferably, about 5 parts is incorporated in the polymeric composition. Such curing systems also contain activators and accelerators of various types, such as zinc oxide (3–5 parts), benzothiazyldisulfide, bismuth dimethyldithiocarbamate, and tetramethylthiuramdisulfide. Curing is usually carried out at temperatures in excess of about 200° F. Illustrative of such preferred cure systems is the sulfur-tetramethylthiuram disulfide-benzothiazyldisulfide system and the sulfur-benzothiazyldisulfide-bismuth diethyldithiocarbamate system.

The presence of free-radical type materials, conventionally used as antioxidants, at levels greater than 0.5 part per hundred of liquid polymer, in the liquid polymeric compositions severely inhibit, and as a practical matter, prohibit room temperature curing, and also curing at reasonable sulfur concentrations. At levels below 0.5 part, neither type of curing is inhibited to any great extent, and small amounts of alkyl, aryl, or aralkyl phenolic antioxidants, preferably 0.3 part, may be added to the liquid polymer to stabilize it during drying. Advantage may be taken of the inhibitory effect by using such materials under specific, carefully controlled conditions, where a longer time before the onset of rigidity is desired. It is possible to increase the time up to twenty four hours before the onset of the "cure," by small, controlled additions (between 0.2 and 2 parts) of a weak amine type free radical stabilizer, as illustrated in Example IV.

The liquid compositions may contain fillers in amounts up to about 100 parts. These include the known fillers for use in rubber compounding, e.g. carbon black, silica, silicates, asbestos, fiber glass, clays, etc. Highly loaded liquid compositions prepared with large amounts of solid compounding components, particularly fillers, will attain "putty"-like characteristics. Such compositions are contemplated as being within the definition of "liquid polymeric compositions." The compositions can also contain one or more colorants, e.g. titanium dioxide to obtain white products when a sulfur curing system is used.

The following examples are furnished to further illustrate the invention to those skilled in the art. All parts and percentages are by weight. The total parts of butadiene and styrene in a given compostion is 100; all other parts are per 100 parts of polymer in the composition.

The liquid polymers are prepared according to emulsion polymerization techniques. The preferred cold emulsion processes generally consist of dispersing the diene monomer (and comonomer when used) in water with a suitable emulsifying agent, such as the sodium or potassium salts of rosin or fatty acids, and polymerizing the reactants with a standard cold polymerization catalyst system. The preferred system, especially where butadiene is homopolymerized, is the sulfoxylate polymerization system described on page 217 of Whitby's "Synthetic Rubber," John Wiley and Son, Inc., New York, 1954, replacing the styrene with butadiene for homopolymerization. By using high levels of mercaptan modifiers, e.g. 1–10 parts, the degree of polymerization is controlled to yield a polymer with the desired liquid properties. After the polymerization has reached an acceptable level of conversion, a shortstop, such as one of the water soluble dithiocarbamates, and stabilizer are added. An alternative shortstop is one comprising sodium hydrosulfite, sodium nitrite, and sodium hydroxide as described in the Texas-U.S. Chemical Company's pending application, Ser. No. 202,092. Prior to drying, 1 to 3 parts per hundred of polymer of a phosphite type antioxidant and/or 0.3 part per hundred of a phenolic antioxidant are added to the polymer (either to latex or to the coagulated polymer) to stabilize the polymer when drying is conducted at elevated temperatures. The polymer is freed from the latex by salt acid or and suitable coagulation procedure and thereafter dried. If the polymer is to be oil extended, the oil can be added either to the polymer latex before coagulation or to the liquid polymer before or after it is dried. In addition to the oil, carbon black or other fillers may also be added, usually to the polymer latex before the coagulation step. These materials are preferably added in amounts up to 100 parts per 100 parts of polymer. The preferred method of incorporating these materials into the polymer is by addition to the polymer latex before the coagulation step. However, these ingredients can also be added afterwards in any suitable mixer providing satisfactory dispersion, such as Hobart mixers, pony mixers or paint mills.

EXAMPLE I

In this example, liquid polymeric compositions were prepared from polymers containing various amounts of styrene and were cured at room temperature. The polymerizations were run at 5° C. using the following recipe in which all parts shown are in parts by weight.

| | |
|---|---:|
| Water | 180 |
| Butadiene | As shown |
| Styrene | As shown |
| Potassium salt of hydrogenated tallow | 4.5 |
| Condensed naphthalene sulfonic acid salt of sodium | 0.15 |
| Potassium phosphate (or KCl) | 0.3 |
| Tertiary dodecyl mercaptan | 1.2–2.4 |
| Para-menthane hydroperoxide | 0.045 |
| Tetrasodium ethylenediamine tetra acetate | 0.089 |
| Ferrous sulfate | 0.015 |
| Sodium formaldehyde sulfoxylate (SFS) | 0.044 |
| Sodium hydrosulfite | 0.30 |
| Sodium hydroxide | 0.075 |
| Sodium nitrite | 0.100 |
| Tris (nonylated phenyl) phosphite | 1.25 |

The polymers for this study were prepared in one-quart bottles by dispersing the butadiene under pressure in a mixture of the water, the tallow salt, the sulfonate salt potassium phosphate, the mercaptan and para-menthane hydroperoxide. Where styrene was used, the butadiene was dissolved in the styrene prior to dispersion in the other ingredients. After mixing was completed, the ferrous sulfate, the ethylenediamine acetate, and the sulfoxylate were injected into the bottle to initiate the polymerization. The samples were rotated in a water bath at 41° F. for 5 to 7 hours at which point the shortstop, consisting of the sodium hydrosulfite, sodium hydroxide, and sodium nitrite, was injected into the bottle. The phosphite was added, and the polymer was coagulated with salt acid, washed with water, and dried by rotating under vacuum at 158° F. for 2 to 3 hours.

The samples were cured at room temperature in the following manner. 100 parts of the liquid polymer were blended by hand with 5.0 parts of para-quinone dioxime, 2.0 parts triethanolamine, 25 parts carbon black and 15 parts silica in a suitable vessel. 12.0 parts of lead dioxide were wetted separately with 6.0 parts of dibutylphthalate. Two mixtures were then combined, mixed and allowed to stand at room temperature until a non-tacky state of cure was obtained. The results of the expriments are shown in the following table:

| Butadiene used in polymerization | Styrene used in polymerization | Percent styrene in polymer | Viscosity of polymer (poises at 25° C.) | Curing time (min.) |
| --- | --- | --- | --- | --- |
| 100 | 0 | 0 | 11,400 | 1 2 |
| 93 | 7 | 5 | 11,000 | 1.5 |
| 86 | 14 | 15 | 9,500 | 1.5 |
| 70 | 30 | 23 | 11,000 | 1.5 |
| 100 2 | 0 | 0 | 4,000 | 1.0 |

1 Hours.
2 Stabilized with 0.3 part of butylated Bisphenol A (Agerite Superlite) in place of the tris(nonylated phenyl)phosphite.

EXAMPLE II

This example demonstrates the room temperature cure of liquid polymeric compositions, including compositions oil extended to different viscosity levels. The polymers were prepared and compounded in the same manner as those described in Example I. In these samples, liquid polybutadiene prepared by emulsion methods was used. The results were as follows:

Viscosity of polymer (poises at 25° F.):     Tack-free curing time (hours)
700 ---------------------------------- 2
1,700 -------------------------------- 2
6,500 -------------------------------- 1.5
11,000 ------------------------------- 2

By the times shown in the table the samples had achieved a tack-free state.

The 1,700 poise sample was allowed to stand for 7 days in order that the fullest possible cure might be obtained. The physical properties were then measured in the usual manner before and after one week's aging at 158° F. with the following results:

| | Before aging | After Aging |
| --- | --- | --- |
| Tensile (p.s.i.) | 400 | 325 |
| Elongation (Percent) | 300 | 120 |
| Shore hardness | 40 | 50 |
| Permanent set (Percent) | 12 | |

An oil extended sample was prepared with the 6500 poise polymer above, by adding 40 parts of Shellflex 371, a naphthenic oil manufactured by Shell Oil Company, to 100 parts, of the liquid polymer. This sample was compounded in the same manner as the other samples. The extended viscosity of the polymer was 2,000 poises at 25° C., and the time of cure for the caulking composition prepared from it was two hours. The cured sample was non-tacky, resilient, and possessed excellent stress/strain properties. It was noted that the vulcanizate showed no sign of bleeding with the 40 parts of oil used here or with oil extensions up to 100 parts. The physical properties of the sample after 7 days at room temperature were as follows:

Tensile (p.s.i.) ---------------------------- 525
Elongation (percent) ----------------------- 285
Shore Hardness ---------------------------- 60
Permanent set (percent) -------------------- 10

EXAMPLE III

In this example, liquid polymeric compositions prepared in the same manner as described in Example I, were cured using a standard sulfur system. 5 parts of sulfur, 5 parts of zinc oxide, 1 part of stearic acid, 0.6 part of bismuth dimethyl dithiocarbamate, and 0.6 part of benzothiazyldisulfide were incorporated into the polymers, and the resulting samples were heated at 260° F. for one hour. All of the resulting compounds were found to be tough, non-tacky, and resilient.

EXAMPLE IV

This example demonstrates the control over room temperature curing time afforded by the use of carefully controlled amounts of a weak amine type free radical stabilizer in the compounding of the liquid polymeric compositions of this invention. Each of the samples shown in the table below were prepared in the same manner as in Example I (including the dioxime curing systems). The polymer used was an unextended liquid emulsion polybutadiene. The free radical stabilizer employed was N-phenyl-N'-cyclohexyl-p-phenylenediamine sold under the trade name "Flexzone 6H" by the Naugatuck Chemical Division of U.S. Rubber Company. This material was incorporated into the polymer latex along with the phosphite stabilizer of Example I, although it could just as well have been added with the other compounding ingredients to the finished polymer. The following table shows the results of the experiments along with the other pertinent information.

| Viscosity of polymer (poises at 25° C.) | Amine stabilizer (parts) | Time of cure (hrs.) |
| --- | --- | --- |
| 8,600 | 0 | 1.5 |
| 8,600 | 1 | 4 |
| 8,600 | 2 | 24 |

After the time periods shown, each of the samples was found to be non-tacky, resilient and possessed of good physical properties.

Similarly, useful liquid polymeric compositions are obtained using, butadiene-acrylonitrile, polyisoprene, polychloroprene, etc. The liquid compositions of this invention are odorless, non-staining, and may be compounded in light colors. They are readily used in the many usages for which cured liquid compositions are employed. The resultant elastomers and rigids have desirable and useful physical and chemical properties.

As many embodiments of this invention may be made without departing from the spirit and scope thereof, it is to be understood that the invention includes all such modifications and variations as come within the scope of the appended claims.

What is claimed is:
1. A liquid polymer composition, which is readily cured to an elastomeric state, comprising 100 parts of a liquid polymer selected from the homopolymers and copolymers of emulsion process conjugated dienes having from four to eight carbon atoms,
(i) at least one stabilizer in effective amount selected from the group consisting of alkyl and aryl substituted phenolic stabilizers, and tris phosphite ester stabilizers, the maximum amount of said phenolic stabilizer being 0.5 part per hundred parts of liquid polymer, the amount of said phosphite stabilizer being between 0.5 part and 5 parts per 100 parts of liquid polymer, and
(ii) a curing system containing between 2 and 10 parts of a curing agent; said liquid polymer having a viscosity between 10 and 20,000 poises at 25° C.
2. The composition of claim 1, wherein when said composition contains a phenolic stabilizer, it is in a maximum concentration of 0.3 part, and when it contains a phosphite stabilizer, it is in an amount between 1 part and 3 parts.
3. The composition of claim 2 wherein the polymer is selected from the class consisting of polybutadiene and styrenebutadiene copolymers, and having a viscosity between 100 and 20,000 poises.
4. The composition of claim 3 wherein the liquid poly- mer contains an extender oil in an amount up to 100 parts per hundred parts of polymer, and has an oil extended viscosity of between 10 and 5,000 poises.

5. A liquid polymer composition, which is readily cured to an elastomeric state, comprising 100 parts of a liquid polymer selected from the homopolymers and copolymers of emulsion process conjugated dienes selected from the group consisting of polybutadiene and styrene butadiene copolymers, having a viscosity between 100 and 2000 poises at 25° C. said polymer containing,
  (i) at least one stabilizer selected from the group consisting of: alkyl and aryl substituted phenolic stabilizers in amount up to 0.5 part per 100 parts of liquid polymer, and tris phosphite ester stabilizers in amount from 0.5 part to 5 parts,
  (ii) and sulfur as a curing agent in amount between 3 parts and 10 parts.

6. A liquid polymer composition, which is readily cured to an elastomeric state, comprising 100 parts of a liquid polymer selected from the homopolymers and copolymers of emulsion process conjugated dienes selected from the group consisting of polybutadiene and styrene butadiene copolymers having a viscosity between 100 and 2000 poises,
  (i) at least one stabilizer selected from the group consisting of alkyl and aryl substituted phenolic stabilizers in amount up to 0.2 part, and tris phosphite ester stabilizers in amount between 1 part and 3 parts,
  (ii) a curing agent consisting of p-quinone dioxane in amount between 2 and 10 parts.

7. A liquid polymer composition, which is readily cured to an elastomeric state, comprising 100 parts of a liquid polymer selected from the homopolymers and copolymers of emulsion process polybutadiene and styrene butadiene copolymers having a viscosity between 100 and 2000 poises at 25° C.,
  (i) at least one stabilizer selected from the group consisting of alkyl and aryl substituted phenolic stabilizers in amount up to 0.5 part, and tris phosphite ester stabilizers in amount from 0.5 to 4 parts,
  (ii) a curing system containing between 2 and 10 parts of a curing agent, which includes 0.2 to 2 parts of a weak amine type free radical stabilizer.

8. The composition of claim 6 containing between 1 and 3 parts of triethanolamine.

9. The composition of claim 8 containing about 5 parts of said dioxime.

10. The composition of claim 6 containing an extender oil in an amount up to 100 parts, and having a viscosity between 10 and 5,000 poises.

11. The composition of claim 5, wherein said composition contains at least one tris (alkyl substituted phenyl) phosphite, and having a viscosity of between 100 and 5,000 poises.

12. The compositions of claim 5 containing accelerators used in conjunction with sulfur.

13. The composition of claim 12 containing about 5 parts of sulfur, 5 parts of zinc oxide, 0.6 part of benzothiazyldisulfide, and 0.6 part of bismuth dimethyl dithiocarbamate.

14. The composition of claim 13 containing an extender oil in an amount up to 100 parts, and having a viscosity of between 10 and 5,000 poises.

15. The composition of claim 12 containing tetramethylthiuram disulfide and benzothiazyldisulfide, as accelerators.

16. The composition of claim 15 containing up to 100 parts of extender oil, and having a viscosity between 10 and 5,000 poises.

References Cited

UNITED STATES PATENTS

| | | | |
|---|---|---|---|
| 2,925,407 | 2/1960 | Goldberg | 260—83.3 |
| 2,395,506 | 2/1946 | Sauser | 260—83.3 |
| 2,524,977 | 10/1950 | Holbrook et al. | 260—83.3 |
| 2,721,185 | 10/1955 | Schulze et al. | 260—33.6 |
| 2,875,170 | 2/1959 | Ayers et al. | 260—33.6 |
| 3,129,197 | 4/1964 | Farrell et al. | 260—33.6 |
| 3,244,661 | 4/1966 | Kline | 260—33.6 |

MORRIS LIEBMAN, *Primary Examiner.*

L. T. JACOBS, *Assistant Examiner.*

U.S. Cl. X.R.

260—45.7, 45.95